United States Patent
Im et al.

(10) Patent No.: US 9,964,314 B2
(45) Date of Patent: May 8, 2018

(54) TRIGENERATION ENERGY SUPPLY SYSTEM

(71) Applicant: Korea Institute of Energy Research, Daejeon (KR)

(72) Inventors: Yong Hoon Im, Daejeon (KR); Jae Yong Lee, Seoul (KR); Dong Hyun Lee, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 119 days.

(21) Appl. No.: 15/021,024

(22) PCT Filed: Jan. 20, 2014

(86) PCT No.: PCT/KR2014/000561
§ 371 (c)(1),
(2) Date: Mar. 10, 2016

(87) PCT Pub. No.: WO2015/037791
PCT Pub. Date: Mar. 19, 2015

(65) Prior Publication Data
US 2016/0223208 A1 Aug. 4, 2016

(30) Foreign Application Priority Data
Sep. 10, 2013 (KR) .................. 10-2013-0108659

(51) Int. Cl.
*F24D 10/00* (2006.01)
*F24F 3/06* (2006.01)
(Continued)

(52) U.S. Cl.
CPC ............ *F24D 10/00* (2013.01); *F01K 27/005* (2013.01); *F03B 13/00* (2013.01); *F24D 1/00* (2013.01);
(Continued)

(58) Field of Classification Search
CPC ........ F24D 10/00; F24D 1/00; F24D 2200/26; F24F 3/06; F01K 27/005; F03B 13/00;
(Continued)

(56) References Cited

U.S. PATENT DOCUMENTS 4,122,356 A * 10/1978 Decker .................... E04B 1/74
165/104.26
4,173,994 A * 11/1979 Hiser ...................... F25B 1/08
126/609

(Continued)

FOREIGN PATENT DOCUMENTS

JP 10-100784 4/1998
JP 2011-112249 6/2011
(Continued)

OTHER PUBLICATIONS

International Search Report dated May 22, 2014, from the Korean Intellectual Property Office Re. Application No. PCT/KR2014/000561 and its Translation into English.

*Primary Examiner* — Hoang Nguyen (57) ABSTRACT

The present invention relates to a trigeneration energy supply system having improved cooling and system use efficiency. The trigeneration energy supply system according to one embodiment of the present invention can comprise: a vacuum pump; a vacuum chamber inside which a vacuum is created by the vacuum pump; a condensed water storage tank positioned higher than the vacuum chamber, and prepared so as to store condensed water formed when steam generated by evaporating water brought inside the vacuum chamber is transferred to the inside of the tank by the vacuum pump; a cooling pipeline arranged to pass through the inside of the vacuum chamber cooled during the water evaporation and prepared to deliver cool air to a cooling load; and a small hydroelectric power generation system for generating electrical power by allowing the condensed water (Continued)

stored in the condensed water storage tank to be poured from at least the height of the condensed water storage tank.

5 Claims, 4 Drawing Sheets

(51) Int. Cl.
    *F01K 27/00*     (2006.01)
    *F03B 13/00*     (2006.01)
    *F24D 1/00*     (2006.01)

(52) U.S. Cl.
    CPC ............ *F24F 3/06* (2013.01); *F24D 2200/26* (2013.01); *F24H 2240/02* (2013.01); *Y02E 20/14* (2013.01); *Y02P 80/14* (2015.11); *Y02P 80/15* (2015.11); *Y02P 80/154* (2015.11)

(58) Field of Classification Search
    CPC .......... Y02P 80/14; Y02P 80/15; Y02E 20/14; F24H 2240/02
    USPC ................... 60/641.8–641.15, 659, 675, 698
    See application file for complete search history.

(56) References Cited

U.S. PATENT DOCUMENTS

| | | | | |
|---|---|---|---|---|
| 4,441,321 | A | * | 4/1984 | Ridgway ............... F01K 27/005 417/52 |
| 4,903,503 | A | * | 2/1990 | Meckler .................. F02G 1/043 62/238.3 |
| 5,488,828 | A | * | 2/1996 | Brossard ................... F03G 7/04 60/641.6 |
| 9,149,758 | B2 | * | 10/2015 | Park .................... B01D 53/0476 |
| 2012/0047891 | A1 | * | 3/2012 | Rosenfeld ............... F25B 25/00 60/652 |

FOREIGN PATENT DOCUMENTS

| | | |
|---|---|---|
| KR | 10-2005-0115706 | 12/2005 |
| KR | 10-2011-0130124 | 12/2011 |
| KR | 10-2013-0034909 | 4/2013 |
| WO | WO 2015/037791 | 3/2015 |

\* cited by examiner

TRIGENERATION ENERGY SUPPLY SYSTEM

RELATED APPLICATIONS

This application is a National Phase of PCT Patent Application No. PCT/KR2014/000561 having International filing date of Jan. 20, 2014, which claims the benefit of priority of Korean Patent Application No. 10-2013-0108659 filed on Sep. 10, 2013. The contents of the above applications are all incorporated by reference as if fully set forth herein in their entirety.

FIELD AND BACKGROUND OF THE INVENTION

The present invention relates to a trigeneration energy supply system capable of providing all of power, heating, and cooling to a building.

Generally, a trigeneration energy supply system is a system which provides all of power, heating, and cooling to a building. A conventional trigeneration energy supply system, in addition to a cogeneration system, uses an absorption type refrigerator, an adsorption type refrigerator, a turbo type refrigerator, a dehumidification type refrigerator, etc. Generation and heating are performed at the same time using the cogeneration system, and cooling is performed by operating the absorption type refrigerator, the adsorption type refrigerator, the turbo type refrigerator, or the dehumidification type refrigerator using waste heat and surplus power generated by a cogeneration process. Particularly, since a demand for heating generally decreases and a demand for cooling greatly increases in summer, it is very important to use waste heat efficiently during the cogeneration process in an aspect of using energy production facilities efficiently.

Korean Patent Publication No. 10-2013-0034909 (Apr. 8, 2013) discloses a configuration formed by combining a cogeneration system which performs power generation and heating with an adsorption type cooling system which performs cooling using waste heat during a cogeneration process. A problem of the conventional technology described above is that the adsorption type (or an absorption type) cooling system has a lower coefficient of performance (COP) than a turbo type cooling system. A COP of the turbo type cooling system is from 3.5 to 4.5, but the adsorption type cooling system using waste heat is merely from 1.0 to 1.5. Accordingly, since it is generally difficult to cope with cooling loads of a whole building only using an adsorption type (or an absorption type) refrigerator, the adsorption type (or the absorption type) refrigerator may be used in combination with a turbo type refrigerator.

Meanwhile, in an aspect of exhaustion of fossil energy sources and reduction of greenhouse gases, it is becoming more important to efficiently utilize new renewable energy sources such as sunlight, wind power, etc. However, a generation amount of sunlight or wind power generation method is not uniform but variable depending on weather, seasons, conditions, etc. Due to intermittent generation which is a disadvantage of sunlight and wind power generation methods, since a point in time at which energy (power, heat, etc.) is generated using a new renewable energy source does not coincide with a point in time at which users demand energy, availability of such new renewable energy sources greatly decreases in the aspects of system operation and economy.

Accordingly, a system for appropriately utilizing an intermittently generated new renewable distributed power source has been needed. Particularly, considering the availability of solar energy, which is capable of generating high amounts of energy in the summer, it is necessary to effectively use solar energy for cooling.

SUMMARY OF THE INVENTION

The present invention provides an efficient trigeneration energy supply system which provides a new type of cooling system using potential energy of a high-rise building structure and properties of water instead of an existing absorption type (or an adsorption type) cooling method having low cooling performance and combines the method with an existing cogeneration system. Particularly, there is provided a trigeneration energy supply system capable of effectively storing and utilizing new renewable energy to solve fundamental disadvantages of intermittently produced new renewable energy sources.

One aspect of the present invention provides a trigeneration energy supply system including a vacuum pump, a vacuum chamber in which a vacuum is formed by the vacuum pump, a condensate water storage tank located above the vacuum chamber and provided to store condensate water formed by transferring vapor formed by evaporating water which flows into the vacuum chamber to an inside by the vacuum pump, a cooling pipe disposed to pass through an inside of the vacuum chamber cooled while the water is evaporated and provided to transfer cold air produced through thermal exchange to a cooling load, and a small hydro power generation system which generates power by dropping the condensate stored in the condensate water storage tank from at least a height of the condensate water storage tank.

The small hydro power generation system may include a small hydro power generation water storage tank located at a top level of a building, and the small hydro power generation water storage tank stores the condensate water.

The trigeneration energy supply system may further include a cogeneration system. Here, the water to be supplied to the vacuum chamber may be hot water generated during a cogeneration process of the cogeneration system.

The trigeneration energy supply system may further include a new renewable power generation system which generates power using one of sunlight and wind power. Here, the vacuum pump may be operated using power generated by the new renewable power generation system.

A refrigerant which flows through the cooling pipe may be one of water, air, and a refrigerant for cooling.

The trigeneration energy supply system may further include a refrigerant storage tank which stores a refrigerant cooled while passing through the cooling pipe.

Another aspect of the present invention provides a trigeneration energy supply system including a vacuum pump, a vacuum chamber in which a vacuum is formed by the vacuum pump, a condensate water storage tank located above the vacuum chamber and provided to store condensate water formed by transferring vapor formed by evaporating water which flows into the vacuum chamber to an inside by the vacuum pump, a cooling pipe disposed to pass through an inside of the vacuum chamber cooled while the water is evaporated and provided to transfer cold air produced through thermal exchange to a cooling load, a second vacuum pump different from the vacuum pump, a second vacuum chamber located above the vacuum chamber, a second condensate water storage tank located above the second vacuum chamber, a second cooling pipe disposed to pass through an inside of the second vacuum chamber cooled while the water is evaporated and provided to transfer cold air produced through thermal exchange to the cooling load, an evaporating pipe which connects the condensate water storage tank with the second vacuum chamber, and a small hydro power generation system which generates power by dropping condensate stored in the second condensate water storage tank from at least a height of the second condensate water storage tank.

The small hydro power generation system may include a small hydro power generation water storage tank located at a top level of a building, and the small hydro power generation water storage tank may store the condensate water.

The small hydro power generation system may further include a circulation pump provided to transfer the condensate water of the second condensate water storage tank located below the small hydro power generation water storage tank to the small hydro power generation water storage tank.

There may be no additional pump installed at the evaporating pipe and the condensate water may be transferred from the condensate water storage tank to the second vacuum chamber due to a pressure difference between the condensate water storage tank and the second vacuum chamber.

The small hydro power generation system may include a circulation pump and a small hydro power generation water storage tank, to which condensate water stored in the second condensate water storage tank is transferred by the circulation pump, the small hydro power generation water storage tank located above the second condensate water storage tank.

According to embodiments of the present invention, there is provided an effect of providing a cooling and power energy storage function by storing a cooled refrigerant and water transferred to an upper portion. Since energy stored at a point in time at which demand and supply of energy do not coincide is withdrawn to appropriately provide cooling at a point in time at which demand occurs through the energy storage function, energy efficiency and operability are increased. Particularly, there are provided not only an effect of efficiently utilizing hot water produced by cogeneration in summer but also an effect of applying new renewable energy such as sunlight, wind power, etc. which are intermittently produced to a trigeneration energy supply system through the energy storage function for efficient use, thereby further increasing energy efficiency of the trigeneration energy supply system.

DESCRIPTION OF SPECIFIC EMBODIMENTS OF THE INVENTION

Since the present invention may have various modifications and several embodiments, exemplary embodiments thereof will be described in detail referring to the drawings. However, the present invention will not be limited to the exemplary embodiments but should be understood as including all modifications, equivalents, and substitutes included in the spirit and the technical scope of the present invention.

It will be understood that although the terms "first", "second", etc. may be used herein to describe various components, these components should not be limited by these terms. These terms are used merely to distinguish one element from another. For example, without departing from the scope of the present invention, a second component may be designated as a first component, and similarly, the first component may be designated as the second component. The term "and/or" includes any and all combinations or one of a plurality of associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening component.

It will be understood that when a component such as a layer, film, region, plate or portion is referred to as being "formed on," another component, it can be directly or indirectly formed on the other component. That is, for example, intervening components may be present. On the contrary, when a component is referred to as being "directly formed on" another component, it will be understood that there is no intervening component.

Terms are used herein only to describe the exemplary embodiments but not to limit the present invention. Singular expressions, unless defined otherwise in contexts, include plural expressions. In the present specification, terms "comprise" or "have", etc. are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless defined otherwise, have the same meaning generally understood by a person of ordinary skill in the art. It will be understood that terms defined in generally used dictionaries are interpreted as including meanings identical to contextual meanings of the related art, unless clearly defined otherwise in the present application, are not interpreted as being ideal or excessively formal meanings.

Hereinafter, the embodiments of the present invention will be described with reference to the attached drawings. Throughout the specification, like reference numerals designate like elements and a repetitive description thereof will be omitted.

Figure 1:
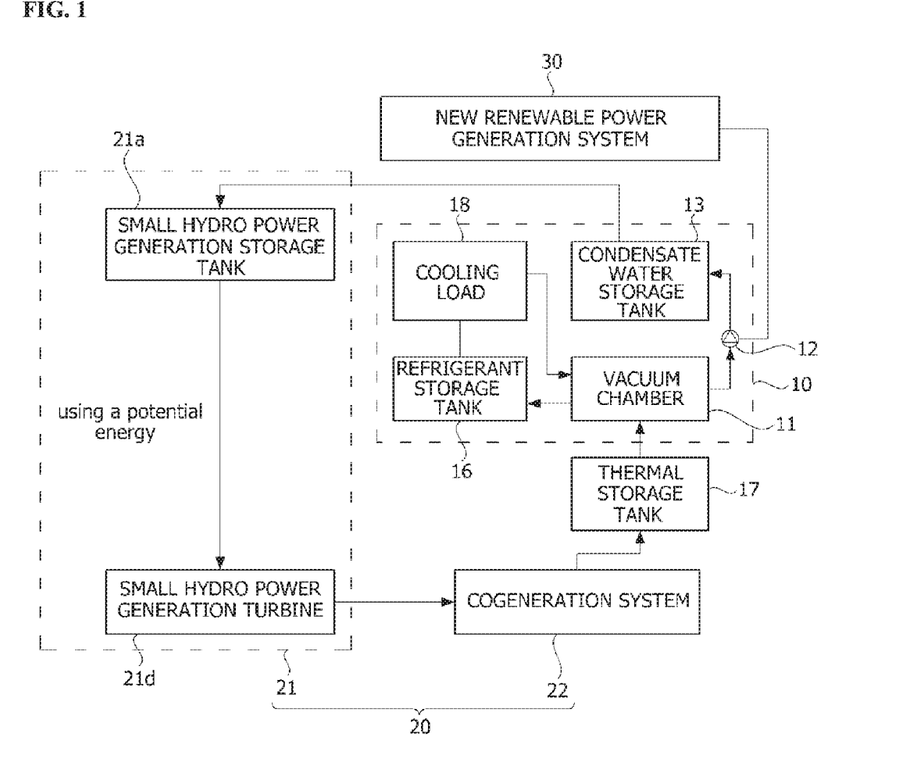
FIG. 1 is a concept view schematically illustrating all components of an energy supply system in accordance with one embodiment of the present invention.
Figure 2:
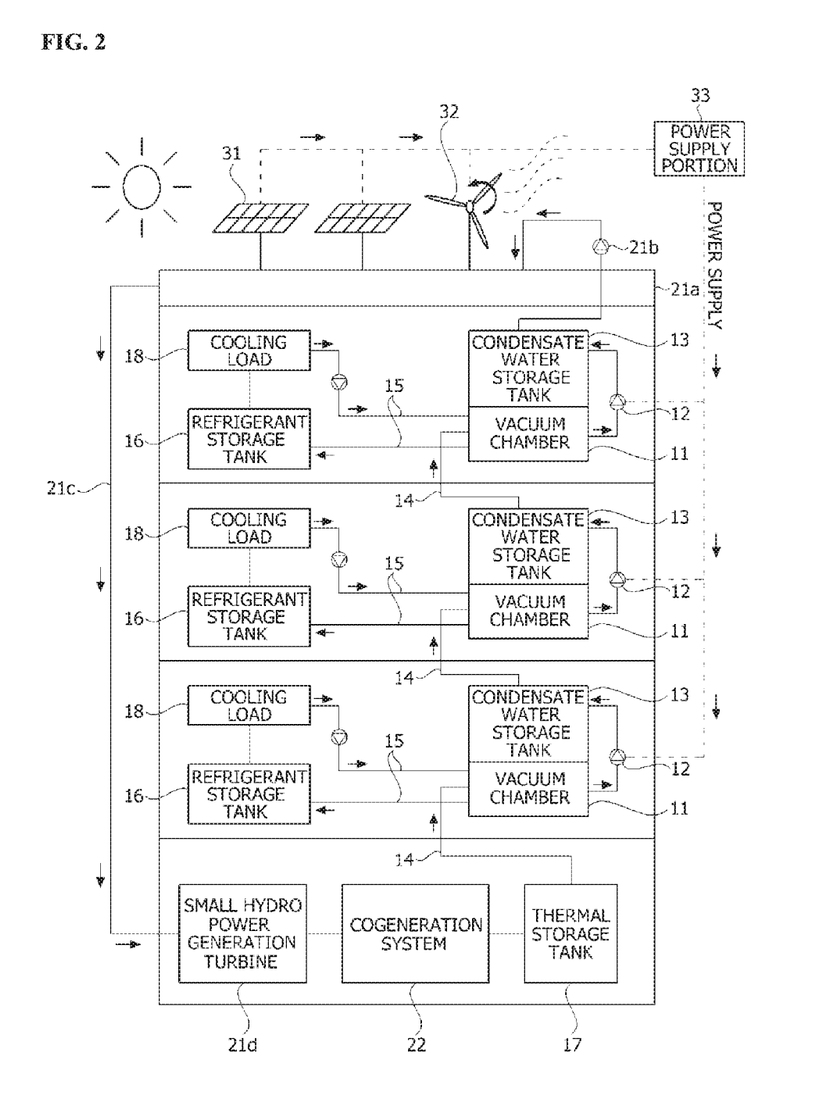
FIG. 2 is a side cross-sectional view schematically illustrating a building to which the energy supply system in accordance with one embodiment of the present invention is applied.

FIG. 1 is a concept view schematically illustrating all components of an energy supply system in accordance with one embodiment of the present invention. FIG. 2 is a side cross-sectional view schematically illustrating a building to which one embodiment of the present invention is applied.

Figure 3:
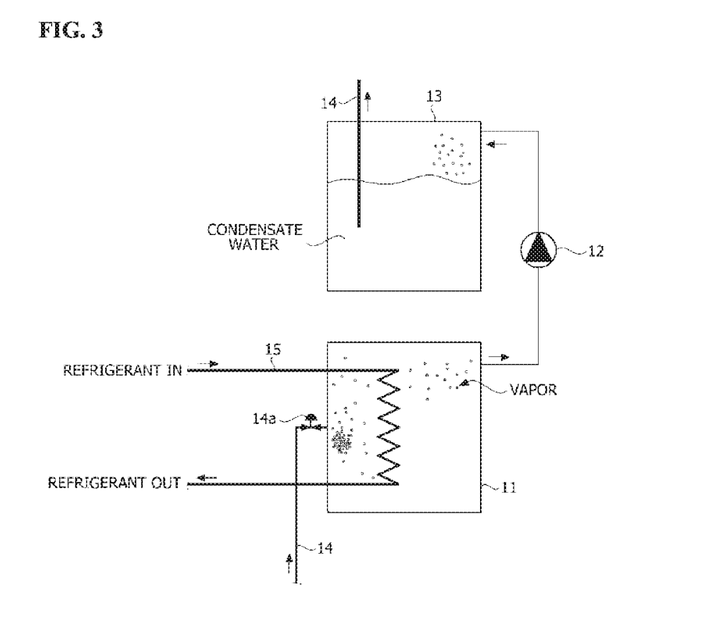
FIG. 3 is a view illustrating a vacuum cooling process in accordance with one embodiment of the present invention.

FIG. 3 is a view illustrating a vacuum cooling process in accordance with one embodiment of the present invention.

Referring to FIG. 1, the energy supply system in accordance with one embodiment of the present invention includes a cooling system 10, a generation system 20, and a new renewable power generation system 30.

Referring to FIGS. 2 and 3, the cooling system 10 is a system which generates cooling energy using power generated from a new renewable energy source and using waste heat from a cogeneration process and includes a vacuum chamber 11, a vacuum pump 12, a condensate water storage tank, an evaporating pipe 14, a cooling pipe 15, a refrigerant storage tank 16, and a thermal storage tank 17. In FIG. 2, the number of stories of the building to which the embodiment is applied is four but it is not limited thereto.

The vacuum chamber 11 is a component in which evaporation of water occurs. The evaporation of water is better performed at a lower pressure and a higher temperature.

Figure 4:
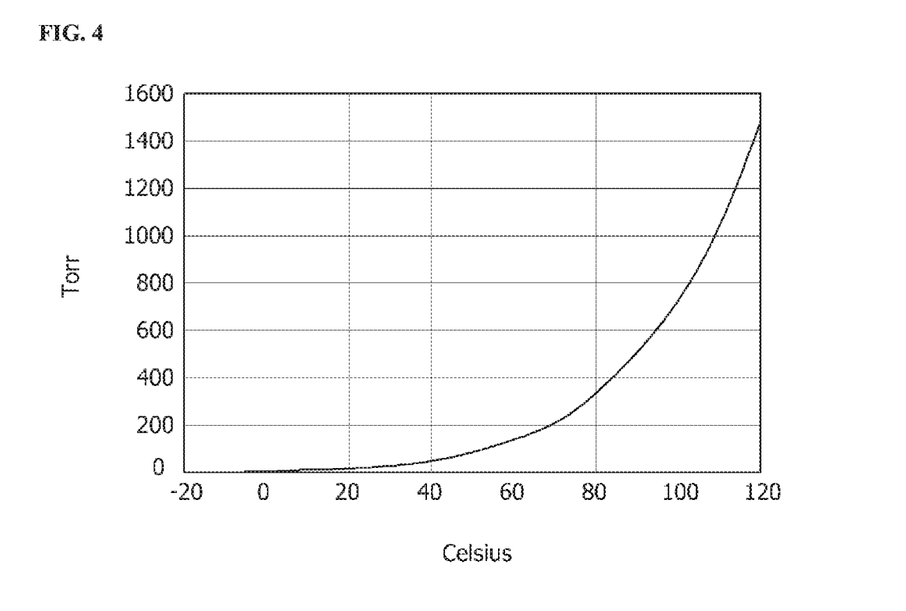
FIG. 4 is a graph illustrating a correlation between atmospheric pressure and temperature for performing evaporation of water.
Figure 5:
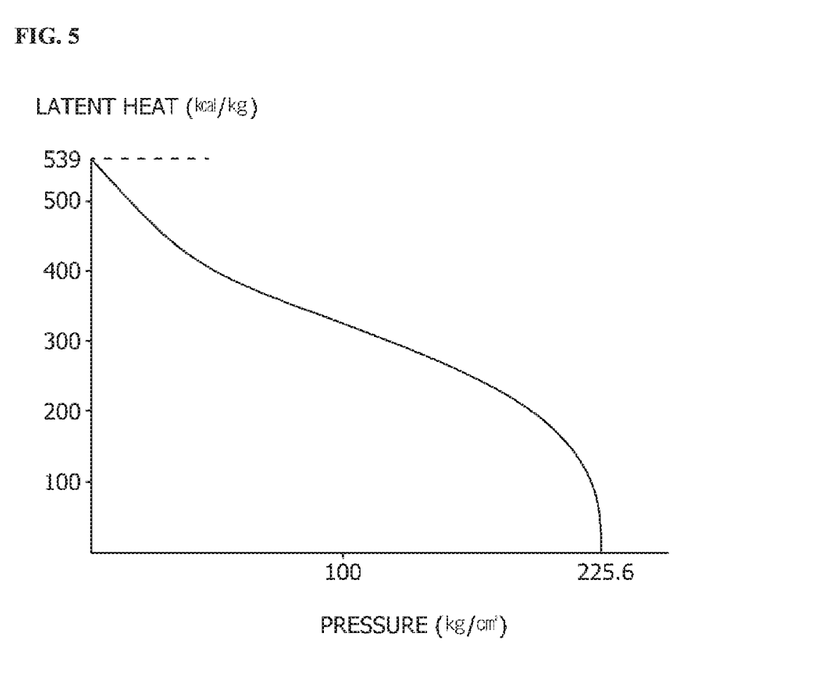
FIG. 5 is a graph illustrating a relationship between pressure and evaporative latent heat of water.
Figure 6:
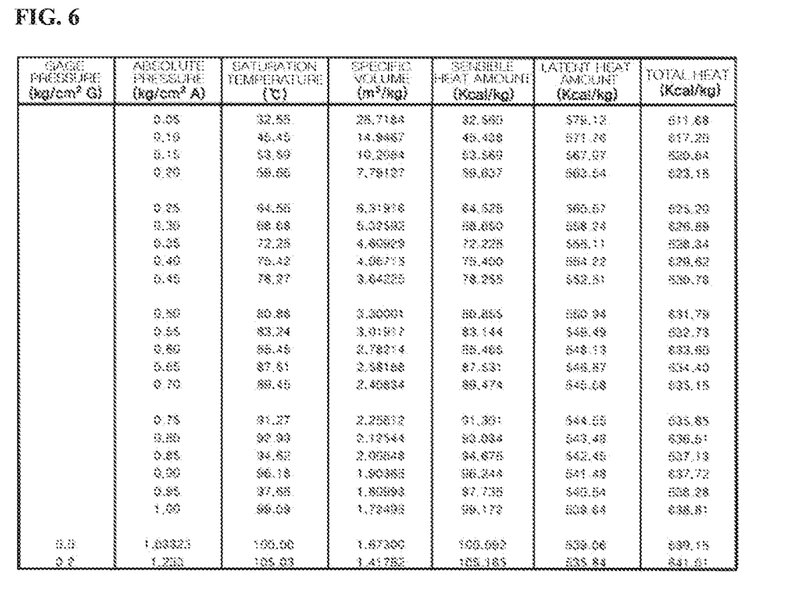
FIG. 6 is a graph illustrating a relationship among absolute pressure, saturation temperature, and latent heat of water.

FIG. 4 is a graph illustrating a correlation between pressure and temperature for performing evaporation of water. FIG. 5 is a graph illustrating a relationship between water pressure and evaporative latent heat. FIG. 6 is a graph illustrating a relationship among absolute pressure, a saturation temperature, and latent heat of water.

Referring to FIG. 4, it may be known that evaporation is better performed at a lower pressure and the same temperature, and the evaporation is better performed at higher temperature and the same pressure.

The vacuum chamber 11 may maintain a high vacuum state at a certain pressure or less due to a pump driven by receiving power generated by a new renewable energy source or surplus power from a cogeneration unit. When a full vacuum state is achieved and a cooling load is necessary, the evaporating pipe 14 is opened to allow hot water in the thermal storage tank 17 produced by cogeneration, especially using abundant waste heat in summer season, or condensate water in the condensate water storage tank 13 to flow into the vacuum chamber 11 and a refrigerant which moves through the cooling pipe 15 is cooled through evaporation of the hot water which flows therein, thereby generating a cooling energy to meet a cooling load 18.

In empirical science, since a condition lower than atmospheric pressure is referred to as a vacuum, the term vacuum will be hereinafter used to refer to a pressure condition lower than atmospheric pressure. As described above, when the hot water in the thermal storage tank produced by cogeneration is used, a temperature of the sprayed hot water is high and a pressure thereof becomes low and thus a condition for easily performing the evaporation of water in the vacuum chamber 11 is formed. That is, even though a vacuum state in the vacuum chamber 11 is not a high vacuum state, the temperature of the sprayed water is high and the saturated vapor pressure becomes high (refer to FIG. 4), and thereby evaporation can be easily performed. Otherwise, even when an evaporation rate of water is excessive and thus pressure in the vacuum chamber 11 is slightly increased, since high saturated vapor pressure of a corresponding temperature is high, a temperature of sprayed hot water in a range satisfying a condition within the saturated vapor pressure still satisfies an evaporable condition, and thus cold air can be constantly produced.

As the water is evaporated, since heat corresponding to evaporative latent heat is consumed, an inside of the vacuum chamber is cooled. Since hot water which is a byproduct of a summer thermal cogeneration process is used in this process, evaporation of the hot water occurs even in a relatively low vacuum condition. Accordingly, since the power (new renewably generated power or surplus power from a cogeneration unit) required to obtain or maintain a high vacuum condition may be reduced against those for the cold water evaporating condition and the evaporation of water is efficiently performed, energy consumed for producing cooling energy is reduced accordingly. In addition, when a new renewably generated energy source such as sunlight, wind power, etc. is used as a power source of the vacuum pump 12, fossil energy consumed for producing cooling energy may be reduced more.

The vacuum chamber 11 may be installed at each level of the building or may be installed for each several levels.

The vacuum pump 12 forms a vacuum in the vacuum chamber 11 and transfers vapor or condensate water to the condensate water storage tank 13. One side of the vacuum pump 12 is connected to the vacuum chamber 11 and the other side thereof is connected to the condensate water storage tank 13 thereabove. As the vacuum pump 12 discharges air and vapor in the vacuum chamber 11, a vacuum is formed in the vacuum chamber 11 and vapor generated while water evaporates is discharged with air together and transferred to the condensate water storage tank 13. General grid power of the building or power generated by a small hydro power generation system 21, a cogeneration system 22, or a new renewable power generation system 30 may be used as a power source of the vacuum pump 12. As an example, in an aspect of generating power using sunlight or wind power generation, the power generated by the new renewable power generation system 30 may be controlled to be preferentially used as the power source of the vacuum pump 12.

The condensate water storage tank 13 is a component into which vapor or condensate water is input from the vacuum chamber 11. The vapor pumped by the vacuum pump 12 from the vacuum chamber 11 is injected into the condensate water storage tank 13.

Meanwhile, during a process of being transferred to the condensate water storage tank 13 as described above, some of the vapor may be condensed and then transferred in a condensate water form.

Since the condensate water storage tank 13 reaches a high pressure due to the vacuum pump 12, a condition for easily condensing vapor into water is provided. That is, to perform condensation, since it is necessary for a pressure to become high or a temperature to become low to satisfy a condition of saturated vapor pressure (dew point), the inside of the condensate water storage tank 13 is maintained in a high pressure condition by the vacuum pump 12. In addition, when the structure or the position of the condensate water storage tank 13 is advantageous for cooling, condensation may be better performed.

The evaporating pipe 14 is a pipe which connects the condensate water storage tank 13 located below with the vacuum chamber 11 located above or connects the thermal storage tank 17 located below with the vacuum chamber 11 located above. One side of the evaporating pipe 14 is located in the condensate water storage tank 13 or the thermal storage tank 17 and the other side thereof is connected to the vacuum chamber 11 located above. A valve 14a may be installed between the evaporating pipe 14 and the vacuum chamber 11 located above. When the valve 14a is opened by a control unit (not shown), condensate water in the condensate water storage tank 13 moves into the vacuum chamber 11 located above through the evaporating pipe 14 due to a pressure difference and is evaporated while being suctioned into the vacuum chamber 11. That is, since the inside of the vacuum chamber 11 becomes a vacuum due to the vacuum pump 12 located above, the condensate water in the condensate water storage tank 13 is allowed to be suctioned into the vacuum chamber 11. The control unit opens the valve 14a at a point in time at which cooling is necessary to perform evaporative cooling. Accordingly, without using an additional pump, the condensate water may be transferred upward using a pressure difference.

The cooling pipe 15 is a component which extracts cold air in the vacuum chamber 11 through thermal exchange to transfer a cooled refrigerant to the cooling load 18. The refrigerant flows in the cooling pipe 15. As the refrigerant, water, air, or various refrigerants generally used in a general refrigerator may be used. Due to a decrease in temperature inside the vacuum chamber 11 according to evaporative cooling, the refrigerant in the cooling pipe 15 is cooled and discharged outward.

The refrigerant storage tank 16 is a component which stores a refrigerant cooled and discharged from the vacuum chamber 11. One side of the refrigerant storage tank 16 may be connected to the vacuum chamber 11 and the other side thereof may be connected to the cooling load 18. The refrigerant is circulated by a pump and sequentially passes through the vacuum chamber 11, the refrigerant storage tank 16, and the cooling load 18. Here, although the cooling load 18 is shown as one component in the drawings, this is merely a schematic illustration of a cooling load discharged from the refrigerant storage tank 16. The cooling load 18 may be a physical storage space of a cooling load or may be a cooling load itself transferred from the refrigerant storage tank 16 to the vacuum chamber 11.

The refrigerant storage tank 16 functions as a tank which stores cold water formed by passing through the vacuum chamber 11 when water is used as a refrigerant. The refrigerant storage tank 16 functions as a buffering means to store a refrigerant and perform cooling as necessary. That is, it may be a type of cooling energy storage means.

Meanwhile, the refrigerant storage tank 16 may be installed on each level of the building or on a particular level thereof.

The thermal storage tank 17 is a component which stores hot water produced during a cogeneration process. One side of the thermal storage tank 17 may be connected to the cogeneration system 22 and the other side thereof may be connected to the vacuum chamber 11. Hot water produced by the cogeneration system 22 is stored in the thermal storage tank 17. When cooling is necessary, the valve 14a of the evaporating pipe 14 is opened and then the hot water is transferred into the vacuum chamber 11 due to a pressure difference. As described above, since evaporation of water is efficiently performed using hot water which is a byproduct of a summer cogeneration process, energy consumed for producing cold air is reduced.

The generation system 20 is a component which generates power and includes the small hydro power generation system 21 and the cogeneration system 22. As an example, the generation system 20 may be located in a basement of the building or around a lower level thereof.

The small hydro power generation system 21 is a component which generates power by driving a turbine using potential energy of water and includes a small hydro power generation water storage tank 21a, a circulation pump 21b, a small hydro power pipe 21c, and a small hydro power generation turbine 21d.

The small hydro power generation water storage tank 21a is a component which stores water transferred upward during a process of operating the cooling system 10 to perform small hydro power generation. Water stored in the condensate water storage tank 13 on a lower level is transferred to the small hydro power generation water storage tank 21a by the circulation pump 21b. The small hydro power generation water storage tank 21a is a type of energy storage which temporarily stores water with potential energy increased in a process of operating the cooling system 10 and performs small hydro power generation using the potential energy of the water when power generation is necessary, thereby generating power. As an example, the small hydro power generation water storage tank 21a may be located at a top level or around an upper level of the building.

The circulation pump 21b is a component which transfers water stored in the condensate water storage tank 13 to the small hydro power generation water storage tank 21a and may be a general pump or a vacuum pump in some cases.

The small hydro power pipe 21c is a component which transfers water stored in the small hydro power generation water storage tank 21a by dropping it.

The small hydro power generation turbine 21d is a component which converts potential energy of the water dropped from the small hydro power generation water storage tank 21a through the small hydro power pipe 21c into power.

The new renewable power generation system 30 is a component which not only generates power using a new renewable energy source such as sunlight, wind power, etc. but also supplies power to the vacuum pump 12 and may include a sunlight power generation system 31, a wind power generation system 32, and a power supply portion 33.

The sunlight power generation system 31 is a component which generates power using sunlight, and the wind power generation system 32 is a component which generates power using power of wind. Although it is shown in FIG. 2 that both systems are used, only one of them may be used. The power supply portion 33 is a component which supplies power generated by the sunlight power generation system 31 or the wind power generation system 32 to the vacuum pump 12. Although power generation performed by the new renewable power generation system 30 is variable and intermittent, an initial vacuum state of a vacuum chamber may be formed by operating an inverter type vacuum pump Also, when continued power generation is available due to an easy outdoor condition for new renewable power generation, it may be used as a power source for operating the vacuum pump while a cooling load is created.

Hereinafter, an operating process in accordance with one embodiment of the present invention will be described.

First, hot water produced by the cogeneration system 22 is stored in the thermal storage tank 17. The stored hot water passes through the evaporating pipe 14 and is transferred to the vacuum chamber 11 due to a pressure difference. The hot water supplied into the vacuum chamber 11 is easily evaporated as vapor due to a low pressure (vacuum) formed in the vacuum chamber 11 by the vacuum pump 12 and a high temperature state of the supplied hot water caused by waste heat collection of cogeneration. Since heat corresponding to evaporative latent heat of water is removed during a process of being evaporated as the vapor, an inside of the vacuum chamber 11 is cooled and a refrigerant which flows through the cooling pipe 15 is cooled through thermal exchange while passing through the vacuum chamber 11. The cooled refrigerant is transferred to and cools a place which needs cooling. The cooled refrigerant may be stored in the refrigerant storage tank 16 when more of the refrigerant than a necessary cooling amount is generated and may be supplied to the cooling load 18 when cooling is necessary.

Vapor suctioned by the vacuum pump 12 is transferred to the condensate water storage tank 13 at an upper level. The condensate water storage tank 13 may be maintained at atmospheric pressure (or pressurized) so that condensation can be easily performed. A relatively high pressure is formed therein due to continued inflow of the vapor by the vacuum pump 12. Accordingly, the vapor is easily condensed and changed in phase into water and condensate water is stored in the condensate water storage tank 13. When the valve 14a of the evaporating pipe 14 is controlled to be opened in a state in which a vacuum is formed in another vacuum chamber 11 at an upper level, the condensate water is suctioned through an end of the evaporating pipe 14 submerged in the condensate water and transferred to the other vacuum chamber 11 at the upper level. That is, due to a pressure difference between a high pressure condensate water storage tank and a low pressure vacuum chamber, water is naturally transferred. Through several stages in this way, water is transferred to a high level of a building, thereby increasing potential energy of the water to transfer the water to the small hydro power generation water storage tank 21a and to store it therein. As a result, power (new renewable energy generation power or surplus power from a cogeneration unit) input during a process of generating a cooling load for each level through the cooling system described above cannot be collected by a general system. However, in the embodiment, some of the input power energy may be collected as potential energy while cooling is performed, thereby improving efficiency of the whole trigeneration energy supply system.

When power is necessary, the water stored in the small hydro power generation water storage tank 21a is discharged through the small hydro power pipe 21c and allowed to fall down. In this process, the small hydro power generation turbine 21d is operated, thereby generating power.

As power of the vacuum pump 12, grid power may be used but power generated by the new renewable power generation system 30 is used to increase energy efficiency.

What is claimed is:

1. A trigeneration energy supply system comprising:
    a vacuum pump;
    a vacuum chamber in which a vacuum is formed by the vacuum pump;
    a condensate water storage tank located above the vacuum chamber and provided to store condensate water formed by transferring vapor formed by evaporating water which flows into the vacuum chamber to an inside by the vacuum pump;
    a cooling pipe disposed to pass through an inside of the vacuum chamber cooled while the water is evaporated and provided to transfer cold air produced through thermal exchange to a cooling load; a second vacuum pump different from the vacuum pump;
    a second vacuum chamber located above the vacuum chamber;
    a second condensate water storage tank located above the second vacuum chamber;
    a second cooling pipe disposed to pass through an inside of the second vacuum chamber cooled while the water is evaporated and provided to transfer cold air produced through thermal exchange to the cooling load;
    an evaporating pipe which connects the condensate water storage tank with the second vacuum chamber; and
    a small hydro power generation system which generates power by dropping condensate stored in the second condensate water storage tank from at least a height of the second condensate water storage tank.

2. The trigeneration energy supply system of claim 1, wherein the small hydro power generation system comprises a small hydro power generation water storage tank located at a top level of a building, and
    wherein the small hydro power generation water storage tank stores the condensate water.

3. The trigeneration energy supply system of claim 2, wherein the small hydro power generation system further comprises a circulation pump provided to transfer the condensate water of the second condensate water storage tank located below the small hydro power generation water storage tank to the small hydro power generation water storage tank.

4. The trigeneration energy supply system of claim 1, wherein no additional pump is installed at the evaporating pipe and the condensate water is transferred from the condensate water storage tank to the second vacuum chamber due to a pressure difference between the condensate water storage tank and the second vacuum chamber.

5. The trigeneration energy supply system of claim 1, wherein the small hydro power generation system comprises a circulation pump and a small hydro power generation water storage tank, to which condensate water stored in the second condensate water storage tank is transferred by the circulation pump, the small hydro power generation water storage tank located above the second condensate water storage tank.

* * * * *